Patented Dec. 25, 1934

1,985,632

UNITED STATES PATENT OFFICE 1,985,632

BRINE SOLUTION

Joseph Fleischer, Dayton, Ohio, assignor to Frigidaire Corporation, Dayton, Ohio, a corporation of Delaware No Drawing. Application November 27, 1931, Serial No. 577,712

6 Claims. (Cl. 252—5)

My invention relates to chemistry and particularly to chemicals for use as "hold-overs" in mechanically cooled refrigerator cabinet as more fully described hereinafter.

In mechanically cooled refrigerator cabinets, it is frequently desirable to provide some means for maintaining a sustained low temperature within the compartment to be cooled even during idle periods of the refrigerating apparatus. Heretofore, it has been proposed to provide, for such purpose, a solution which will freeze during the operation of the refrigerating apparatus and which will melt during the idle periods and withdraw its latent heat of fusion from the compartment to be cooled.

Such solutions have been either cryohydrates, melting and freezing at substantially one temperature or solutions melting and freezing over a wide range of temperatures.

Theoretically from a refrigerating standpoint alone, the ideal solution is the cryohydrate which freezes and melts at a definite temperature for, obviously, a cryohydrate may be chosen which has a melting point sufficiently low to cause a removal of latent heat at substantially the temperature at which it is desired to maintain the compartment. From a practical standpoint, however, cryohydrates have their disadvantages, chief among which is the tendency to distort the containers due to the expansion occurring on freezing, since they freeze to hard solids.

To avoid this difficulty, aqueous solutions which freeze to a slush form and remain partially liquid to very low temperatures have been proposed. Such solutions, for example aqueous solutions of ethylene glycol, freeze and melt over a wide temperature range. This last fact constitutes a serious disadvantage since on melting, such solutions do not withdraw their latent heat from the compartment to be cooled, at a constant or substantially constant temperature.

My invention proposes solutions that combine the advantages of both prior proposals, by providing solutions, the majority or substantially all of which melt and freeze over a small range of temperatures, yet the last trace of which does not freeze until a much lower temperature has been reached. This prevents any damage to the container from any expansion which takes place when the solution freezes.

As a specific example of my invention, I provide the following composition, as Example No. 1:

| | Per cent |
|---|---|
| KCl | 15 |
| BaCl$_2$ | 5 |
| NaCl | 5 |
| H$_2$O | 75 | the percentages being given by weight.

The cryohydrate consisting of the potassium chloride, barium chloride, and water in substantially the proportions listed above has a eutectic point of about 12° F. That is to say, such composition melts and freezes at substantially 12° F. as if it were a pure substance. I have found that by the addition of the sodium chloride to the cryohydrate, at least 90% of the resulting solution freezes between substantially 8° to 12° F. and that the mixture does not freeze completely solid until a temperature of substantially −10° F. has been reached.

As a second specific example of my invention, I provide the following composition, as Example No. 2:

| | Per cent |
|---|---|
| KCl | 15 |
| CaCl$_2$ | 5 |
| H$_2$O | 80 | where the percentages are given by weight.

To this solution may be added ½% of sodium or potassium chromate to improve corrosion resisting properties.

The cryohydrate consisting of potassium chloride and water in substantially the proportions listed above has a eutectic point of about 13° F. By the addition of the calcium chloride, at least 90% of the resulting solution freezes substantially between 6° and 13° F. and, in fact, the solution does not freeze solid until a temperature of approximately −60° F. has been reached.

As a third specific example, I provide the following:

| | Per cent |
|---|---|
| KCl | 17 |
| Ethylene glycol | 6 |
| H$_2$O | 77 | where percentages are given by weight.

I have found that the addition of the ethylene glycol causes the major part of the above composition to freeze and melt between 5° and 12° F. while preventing the freezing of the last trace of the solution until a temperature of substantially −60° F. is reached.

As a fourth specific example, I provide the follow composition:

| | Per cent |
|---|---|
| K$_2$CrO$_4$ | 30 |
| Na$_2$CrO$_4$ | 5 |
| H$_2$O | 65 | where percentages are given by weight.

The major portion of this composition freezes and melts between 8° and 12° F. while the last trace thereof does not freeze until a substantially lower temperature has been reached.

In the above specific examples, I have found that the addition of NaCl, CaCl$_2$, ethylene glycol and Na$_2$CrO$_4$ in the respective compositions prevents the complete freezing of the compositions until a temperature substantially lower than the eutectic temperature has been reached. Substantially all the melting, however, and consequently the withdrawal of latent heat from the surroundings takes place over a very small range of temperatures close to the eutectic temperature.

This property is especially valuable when the solutions are used in sealed containers for hold-over purposes in refrigerated cabinets as hereinbefore described. For example, one or more containers having one of the above solutions therein may be placed within a refrigerated cabinet. During normal operation of the refrigerating apparatus, the solutions remain almost completely solidified. During shut-down periods of the apparatus, the solutions will melt, removing heat from the refrigerated cabinet and thereby acting as a hold-over or auxiliary refrigerant in cases of emergency. These solutions cannot damage the sealed containers by any expansion which takes place when they freeze, since they remain partially liquid under normal operating conditions.

What is claimed is as follows:

1. A composition of matter comprising an aqueous solution of potassium and barium chlorides in substantially their cryohydrate composition having added thereto a small amount of another salt to permit freezing of most of the solution within a small range of temperatures close to the eutectic temperature while preventing complete solidification until a low temperature has been reached.

2. A composition of matter comprising an aqueous solution of potassium chloride in substantially its cryohydrate composition having added thereto a small amount of calcium chloride to permit freezing of most of the solution within a small range of temperatures close to the eutectic temperature while preventing complete freezing until a low temperature is reached.

3. A composition of matter comprising an aqueous solution of potassium and barium chlorides in substantially their cryohydrate composition having a small amount of sodium chloride added thereto to permit freezing of most of the solution within a small range of temperatures close to the eutectic temperature while preventing complete freezing until a low temperature is reached.

4. A composition of matter substantially of the following composition; 15% KCl, 5% BaCl$_2$, 5% NaCl, 75% H$_2$O when the percentages are given by weight.

5. A composition of matter substantially of the following composition; 17% KCl, 6% ethylene glycol, 77% H$_2$O where the percentages are given by weight.

6. A composition of matter substantially of the following composition, 15% KCl, 5% CaCl$_2$, 80% H$_2$O where the percentages are given by weight.

JOSEPH FLEISCHER.